Patented Sept. 18, 1951

2,568,142

UNITED STATES PATENT OFFICE 2,568,142

ARYL-GLYCINEDIALKYLAMIDES

William F. Bruce, Haverton, and Joseph Seifter, Willow Grove, Pa., assignors to Wyeth Incorporated, Philadelphia, Pa., a corporation of Delaware No Drawing. Application May 12, 1948, Serial No. 26,714

6 Claims. (Cl. 260—558)

This invention relates to new substituted glycinamides and more particularly relates to especially useful compounds falling within the general formula RNHCH$_2$CONR'R'' wherein the designations R, R' and R'' indicate specific groups as will be disclosed below. This application is a continuation-in-part of application, Serial No. 673,154, filed May 29, 1946, now abandoned.

Compounds having the general formula as indicated above are useful for many purposes depending on the particular substituents represented by R, R' and R''. One use of importance is their use as intermediates for the preparation of other organic compounds. Of particular interest, however, are those compounds which evidence a pharmacological action sufficiently high to make the compounds valuable primarily as therapeutics. Thus, compounds covered by the invention evince some pharmacological activity such as anesthetic, analgesic, soporific or other important physiological action which is considered quite useful in the medicinal field.

The new and useful compounds of the invention may be prepared by reacting an appropriate chloracetamide corresponding to the formula

ClCH$_2$CONR'R'' where R' and R'' represent ethyl, propyl or butyl radicals, with a primary amine having the formula RNH$_2$ where R represents an aryl or substituted aryl radical.

The term "substituted" aryl radical is intended to mean those radicals wherein one or more of the phenyl ring hydrogens are replaced by various substituents.

In a preferred method of synthesis, chloracetyl chloride is reacted with the secondary amine R'R''NH in the presence of benzene or ether as a solvent for the reactants. Heating may or may not be necessary depending on the speed of the particular reaction. The chloracetamide remains in solution in the solvent and is obtained by distilling off the solvent under reduced pressure. In general, a molar ratio of chloride to amine of about 1:2 is preferred for the reaction.

The reaction of the appropriate chloracetamide and the appropriate primary amine to form the desired substituted glycinamide is preferably operated with a molar ratio, amide to amine of about 1:1 and is carried out in the presence of a solvent for the reactants such as higher alcohols having four to seven carbon atoms in the molecule, dioxane or hydrocarbon solvents such as xylene. The reaction is carried out in the presence of an acid acceptor or mildly basic material such as alkali or alkaline earth metal carbonates, sodium bicarbonate or alkali metal alcoholates and preferably about 2 to 3 mols of this material is used. The reaction operation is set up for refluxing and the reaction temperature is the refluxing temperature of the particular solvent selected. Generally, a reaction or refluxing time of about 10–15 hours is sufficient for complete reaction. In the event that solids are formed these are removed by filtration, the substituted glycinamide product remaining in solution in the solvent. The solvent is finally removed by distillation at low pressures to obtain the desired product.

The following examples illustrate the invention:

EXAMPLE 1

*Alpha-anilino-N,N-diethyl acetamide*

To a solution of 298 grams of alpha-chloraceto N,N-diethylamide and 186 grams of aniline in 1500 c. c. of n-butanol, 100 grams of powdered sodium carbonate was added and the mixture refluxed for two hours. An additional 100 grams of sodium carbonate was then added, and refluxing continued for two hours more. After adding 12 grams more sodium carbonate, with the observation that no further carbon dioxide evolved, about half the butanol was removed on an oil bath. The solids consisting largely of inorganic salts were filtered off and the filtrate concentrated in vacuo and distilled. The product, alpha-anilino-N,N-diethyl acetamide weighed 315 grams and boiled at 155–170° C. at 0.7 mm. or 180–190° C. at 6 mm. It solidified on standing to a pale yellow mass melting at 38° C. A sample was crystallized from ethyl acetate without altering the melting point.

ANALYSIS

|  | Carbon | Hydrogen | Nitrogen |
|---|---|---|---|
| Calculated for C$_{12}$H$_{18}$N$_2$O | 69.8 | 8.7 | 13.55 |
| Found | 69.84 | 8.64 | 13.31 |

EXAMPLE 2

*Para-toluidino-N,N-diethyl acetamide*

A solution of 428 g. of p-toluidine in 4 l. of n-butanol was refluxed with 603 g. of chloro-N,N-diethylacetamide and 454 g. of dry sodium carbonate for 16 hrs. with stirring in the presence of 10 marbles. After cooling, water was added to dissolve the salt. The butanol was concentrated and the residue distilled. The product collected at 180–185° at 1.5 mm. weighed 411 g. (47%). The product solidified and melted at 58–60°. On crystallization from methanol, the melting point was 59–60°.

ANALYSIS

|  | Carbon | Hydrogen | Nitrogen |
|---|---|---|---|
| Calculated for C$_{13}$H$_{20}$N$_2$O | 70.91 | 9.09 | 12.73 |
| Found | 70.56 | 9.03 | 12.61 |

EXAMPLE 3

Ortho-toluidino-N,N-diethyl acetamide

A solution of 53.5 g. of o-toluidine in 500 c. c. of n-butanol was refluxed with 75 g. of chloro-N,N-diethylacetamide and 58 g. of sodium carbonate for 16 hrs. After cooling, the butanol solution was washed with water, concentrated and distilled to give 98 g. of product boiling from 165–175° at 0.8 mm. After two redistillations, 42.8 g. of product boiling from 165–170° at 0.4 mm. remained. The product remained a yellow oil, $n_D^{30.5}$ 1.537. Redistillation of the foreruns gave a small additional amount of product.

EXAMPLE 4

Para-phenetidino-N,N-diethyl acetamide

A solution of 137 g. of p-toluidine, freshly distilled, and 150 g. of chloro-N,N-diethyl acetamide in 1 l. of n-butanol was refluxed with 113 g. of dry sodium carbonate for 16 hours with stirring. After cooling, washing with water and concentrating the butanol, the product distilled at 199–220° at 1.5 mm. and weighed 132.5 g. It solidified and melted at 50–55°. On crystallization from ethyl acetate-hexane, it melted at 52–55°.

ANALYSIS

|  | Carbon | Hydrogen | Nitrogen |
|---|---|---|---|
| Calculated for $C_{14}H_{22}N_2O_2$ | 67.26 | 8.89 | 11.20 |
| Found | 67.36 | 8.53 | 11.32 |

EXAMPLE 5

Ortho-phenetidino-N,N-diethyl acetamide

A solution of 137 g. of o-phenetidine (1 mol.) and 165 g. of chloro-N,N-diethyl acetamide (1.1 mole) in 1 l. of n-butanol was stirred and refluxed 16 hours with 115 g. of dry sodium carbonate. Upon washing with water and concentrating the butanol, 159 g. (64%) of the product distilled from 178–200° at 1.5 mm. and on redistillation, boiled at 170–180° at 1 mm. The product is a pale yellow oil, boiling at 190–200° C. at 1.5 mm.

ANALYSIS

|  | Carbon | Hydrogen | Nitrogen |
|---|---|---|---|
| Calculated for $C_{14}H_{22}N_2O_2$ | 67.20 | 8.89 | 11.20 |
| Found | 67.01 | 8.64 | 11.37 |

EXAMPLE 6

Para-anisidino-N,N-diethyl acetamide

A solution of 61.6 g. of p-anisidine and 74.8 g. of chloro-N,N-diethyl acetamide in 500 c. c. of n-butanol was stirred and refluxed for 16 hours with 53 g. of dry sodium carbonate. After washing with water and concentrating the butanol solution, the product boiled at 164–170° at 0.5 mm. yield 86.5 g. (73.2%). The final product was obtained in the form of white crystals melting at 65–67° C.

ANALYSIS

|  | Carbon | Hydrogen | Nitrogen |
|---|---|---|---|
| Calculated for $C_{13}H_{20}N_2O_2$ | 66.10 | 8.47 | 11.86 |
| Found | 65.86 | 8.88 | 11.55 |

EXAMPLE 7

Ortho-anisidino-N,N-diethyl acetamide

A solution of 138 g. (1.12 mols) of o-anisidine and 183 g. (1.3 mols) of chloro-N,N-diethyl acetamide in 1 l. of n-butanol was refluxed 16 hours at 110–115° with stirring in the presence of excess dry sodium carbonate (200 g.). After the butanol solution was washed with water and concentrated, the product was distilled, boiling at 183–188° at 1 mm. Redistillation gave 103 g. (40%) of a pale yellow oil, which slowly solidified in the cold room to white crystals melting at 35°.

ANALYSIS

|  | Carbon | Hydrogen | Nitrogen |
|---|---|---|---|
| Calculated for $C_{13}H_{20}N_2O$ | 66.10 | 8.47 | 11.86 |
| Found | 65.95 | 8.72 | 12.01 |

EXAMPLE 8

Mesidino-N,N-diethyl acetamide

A solution of 26.2 g. of mesidine and 32.1 g. of chloro-N,N-diethyl acetamide in 200 c. c. of n-butanol was stirred and refluxed 16 hours with 22 g. of dry sodium carbonate. The salt was washed out with water, the butanol was concentrated and 38 g. (62%) of product distilled boiling from 165–170 at 1 mm.; redistillation after washing with 5% sodium hydroxide to remove halogen acid compounds still present, gave 26.5 g. boiling at 166–168° (43%). Some of the product was collected in the forerun.

ANALYSIS

|  | Carbon | Hydrogen | Nitrogen |
|---|---|---|---|
| Calculated for $C_{15}H_{24}N_2O$ | 72.58 | 9.60 | 11.29 |
| Found | 71.80 | 9.00 | 11.9 |

EXAMPLE 9

2,5-dichloro-anilino-N,N-diethyl acetamide

A solution of 81 g. of 2,5-dichloroaniline and 83 g. of chloro-N,N-diethyl acetamide in 500 c. c. of n-butanol was held at 100° and stirred with 58 g. of dry sodium carbonate for 16 hours. After washing the solution with water and concentrating, the product was distilled, b.o.5 190–205°, to give 70 g. of oil which finally crystallized after several days to a white powder m. 78–110°. After washing this powder with dilute hydrochloric acid and water, it melted at 78–83°. Crystallization from methanol gave 42 g. (31%) white crystals melting at 88–89°.

ANALYSIS

|  | Carbon | Hydrogen | Nitrogen | Chlorine |
|---|---|---|---|---|
| Calculated for $C_{12}H_{16}N_2OCl_2$ | 52.36 | 5.82 | 11.02 | 25.8 |
| Found | 51.94 | 5.74 | 10.64 | 26.1 |

EXAMPLE 10

Meta-nitroanilino-N,N-diethyl acetamide

A solution of 69 g. of m-nitroaniline and 82.5 g. of chloro-N,N-diethyl acetamide in 500 c. c. of n-butanol was heated and stirred at 100° with 58 g. of sodium carbonate for 16 hours. The butanol solution was washed with water, concentrated and cooled to give a solid which was crystallized from methanol to give 48 g. (38%) yellow crystals m. 120–121°.

ANALYSIS

|  | Carbon | Hydrogen | Nitrogen |
|---|---|---|---|
| Calculated for $C_{12}H_{17}N_3O_2$ | 57.4 | 6.78 | 16.71 |
| Found | 57.20 | 6.72 | 16.30 |

EXAMPLE 11

*Ortho-carboxyanilino-N,N-diethyl acetamide*

A solution of 68.5 g. of anthranilic acid and 75 g. of chloro-N,N-diethyl acetamide in 500 c. c. of n-butanol was mixed with 85 g. of sodium carbonate and heated to 100° in a wax bath held at 100° for 6 hours. The butanol was then washed repeatedly with 10% sodium carbonate solution to remove the product; 3-4 liters of aqueous extract was thus obtained. The water was then slightly acidified by hydrochloric acid until no further precipitate appeared. The solid was filtered and the filtrate concentrated on a steam bath. The product was crystallized from methanol and melted at 183-4° (corr.).

ANALYSIS

|  | Nitrogen |
|---|---|
| Calculated for $C_{13}H_{18}N_2O_3$ | 11.20 |
| Found | 11.16 |

It is obvious from a study of the examples that other substituted anilino acetamides may be produced as illustrated above, either by replacing the hydrogen on the ring with substituents which modify the physiological action or by the use of obvious substituents for R' and R". In the latter case, instead of using chloro-N,N-diethyl acetamide, for example, one may start with chloro-N,N-dipropyl or dibutyl acetamide in order to produce compounds of similar usefulness. In general, however, the diethyl acetamides have been found especially desirable for pharmacological purposes since they are generally more soluble than the higher alkyls and relatively non-toxic.

The products of the invention are either high boiling liquids or solids which are basic in reaction. It is contemplated that while the products may be used in this basic form, it is within the scope of this invention that they may be prepared and used in the form of their acid-addition salts. The preparation of an acid-addition salt is well-known and generally involves the addition of the selected acid to an ether, alcohol or water solution of the basic material. The acid is chosen to yield a salt which is known to those skilled in the art as being physiologically non-toxic. As examples, the hydrochloride, sulfate or tartrate salts of the products may be used.

It is further contemplated that those substituted glycinamides, or the non-toxic salts thereof, which are less soluble in dilute acid than 0.5% by weight may be brought into satisfactory solution by the use of solubilizing, surface-active emulsifying or detergent agents in order to obtain a more complete physiological effect of the specific glycinamide. Lipoid solvents having a physiologically non-toxic effect such as long chain fatty acid partial esters of hexitol anhydrides or oxyalkylene derivatives thereof, vegetable and animal oils and ointment bases such as Vaseline or cholesterol are examples of solvents that are considered useful in admixture with the substituted glycinamides for obtaining an enhanced physiological effect.

Many modifications of the invention will be apparent to those skilled in the art without departure therefrom or from the scope of the claims, and since the foregoing disclosure has been given by way of example for clearness and understanding only, no unnecessary limitations should be understood and the appended claims should be construed as broadly as the state of the art permits.

We claim:

1. New compounds selected from the group consisting of substituted glycinamides having the formula

wherein R is a member of the group consisting of phenyl, lower alkylphenyl, lower alkoxyphenyl, nitrophenyl, and halogenphenyl radicals; and wherein R' and R" represent lower alkyls each having more than one carbon atom in the chain; and the non-toxic salts of said substituted glycinamides.

2. As new compounds, alpha-monosubstituted amino-N,N-di-lower alkyl acetamides, wherein the monosubstituent is a mono-cyclic isocyclic aromatic radical, the ring being directly attached to the alpha nitrogen atom, and each lower alkyl consisting of more than one carbon atom.

3. As new compounds, alpha-anilino-N,N-di-lower alkyl acetamides, said alkyls each having at least two carbon atoms in the alkyl chain.

4. The new compound, alpha-anilino-N,N-diethyl acetamide.

5. The new compound, alpha-toluidino-N,N-diethyl acetamide.

6. A new compound, alpha-para-phenetidino-N,N-diethyl acetamide.

WILLIAM F. BRUCE.
JOSEPH SEIFTER.

REFERENCES CITED

The following references are of record in the file of this patent:

UNITED STATES PATENTS

| Number | Name | Date |
|---|---|---|
| 2,139,190 | Iselin et al. | Dec. 6, 1938 |

OTHER REFERENCES

Chemical Abstracts, vol. 19, p. 3083 (1925).
John et al.: "J. Prakt. Chem.," vol. 139, p. 288 (1933).